J. J. Wait,
Lamp-Chimney Cleaner.
Nº 78,160. Patented May 19, 1868.
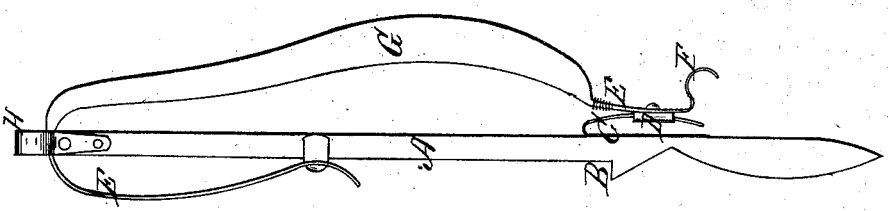
Witnesses;
J. L. Boone
Geo. H. Strong
Inventor;
John J. Wait
By his Atty's.
Dewey & Co

United States Patent Office.

JOHN JACKSON WAIT, OF OREANA, NEVADA.

*Letters Patent No. 78,160, dated May 19, 1868.*

---

IMPROVED LAMP-CHIMNEY CLEANER.

---

The Schedule referred to in these Letters Patent and making part of the same.

---

TO ALL WHOM IT MAY CONCERN:

Be it known that I, JOHN JACKSON WAIT, of Oreana, county of Humboldt, State of Nevada, have invented an Improved Lamp-Chimney Cleaner; and I do hereby declare the following description and accompanying drawings are sufficient to enable any person skilled in the art or science to which it most nearly appertains to make and use my said invention or improvements without further invention or experiment.

My invention is for the purpose of cleaning lamp-chimneys, such as are used principally for kerosene-lamps.

The implement consists of a wooden handle, to which are attached a spring and cushion, connected with a guide and thumb-piece, by which the spring is expanded as desired, to press against the inner surface of the chimney. A hook is placed at the end, which may be made to hold a cloth which falls around the implement, and prevents it from being soiled in the operation of cleaning the chimney.

To more fully illustrate and describe my invention, reference is had to the accompanying drawings, forming a part of this specification, of which—

Figure 1 is a side view.

Figure 2 is a back view.

A represents the rod of the implement, having a notch, B, cut in it, just above the handle, for the purpose of arresting its upward movement as it comes against the end of the chimney.

At the opposite side of the handle is attached a piece of metal, C, bent nearly double, on which a slide, D, attached to the cushion-spring, operates.

A flat spring, E, of annealed copper, is connected to the slide, and extends over the top of the rod, to which it is fastened by a strap, and extends down to near the centre on the opposite side, where it is clipped to the bar. The lower end is curved in a manner to form a convenient piece, F, for the operator to push upwards, and throw out the cushion.

A cushion, G, of any soft and yielding material, is placed around the flat spring, and is made a little larger near the lower end, so as to more nearly conform to the shape of the chimney.

To the top of the rod is attached a hook, H, in which is placed a piece of cloth, which may completely surround the implement, and prevent the cushion from being soiled.

The glass to be cleaned should be first dipped in warm water, and the implement thrust into the lower opening of the chimney. By placing the thumb on the thumb-piece, the cushion may be made to press against the entire length of the chimney, when, by turning the cleaner around, the chimney will be thoroughly cleaned.

Having thus described my invention, what I claim, and desire to secure by Letters Patent, is—

The combination of the cushion G and the spring E, the thumb-piece F, at the lower end of the spring, and the slide D, operating on the guide-plate C, the whole constructed and made to operate substantially as and for the purpose herein described.

In witness whereof, I have hereunto set my hand and seal.

JOHN JACKSON WAIT. [L. S.]

Witnesses:
 FRED. F. WRIGHT,
 F. L. PERKINS.